United States Patent
Matsui et al.

(10) Patent No.: US 7,081,931 B2
(45) Date of Patent: Jul. 25, 2006

(54) LIQUID CRYSTAL DISPLAY HAVING ALUMINUM WIRING

(75) Inventors: Akihiro Matsui, Kawasaki (JP); Katsunori Misaki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 39 days.

(21) Appl. No.: 10/766,416

(22) Filed: Jan. 27, 2004

(65) Prior Publication Data

US 2004/0183763 A1 Sep. 23, 2004

(30) Foreign Application Priority Data

Jan. 27, 2003 (JP) ............................. 2003-017307

(51) Int. Cl.
*G02F 1/136* (2006.01)
*G02F 1/1343* (2006.01)

(52) U.S. Cl. .......................... 349/46; 349/39; 349/139

(58) Field of Classification Search ................ 349/39, 349/42, 46, 139; 438/151, 158
See application file for complete search history.

(56) References Cited

U.S. PATENT DOCUMENTS

| 5,825,437 | A | * | 10/1998 | Seo et al. ..................... 349/46 |
| 6,081,308 | A | * | 6/2000 | Jeong et al. .................. 349/42 |
| 6,344,377 | B1 | * | 2/2002 | Ahn et al. .................. 438/158 |
| 6,426,733 | B1 | * | 7/2002 | Yamada ..................... 345/74.1 |
| 6,528,357 | B1 | * | 3/2003 | Dojo et al. ................. 438/151 |
| 2005/0128403 | A1 | * | 6/2005 | Liu ............................. 349/141 |

FOREIGN PATENT DOCUMENTS

| JP | 64-084668 | 3/1989 |
| JP | 06-120503 | 4/1994 |
| JP | 11-087716 | 3/1999 |

* cited by examiner

*Primary Examiner*—Huyen Ngo
(74) *Attorney, Agent, or Firm*—Greer, Burns & Crain, Ltd (57) ABSTRACT

A liquid crystal display including a liquid crystal display substrate, a main wiring layer made of Al or Al alloy and formed on the substrate, a protective layer containing refractory metal and formed on the main wiring layer. Preferably, an upper surface of the main wiring layer has an average roughness of 3 nm or larger.

7 Claims, 6 Drawing Sheets

|  |  | NUMBER OF WHISKERS FORMED ON EACH SUBSTRATE | SURFACE ROUGHNESS Ra (nm) |
|---|---|---|---|
| SAMPLE A | SUBSTRATES WITH HEATING | 0 | 3.39 |
| SAMPLE C | SUBSTRATES WITHOUT HEATING | 203 | 0.99 |

|  |  | NUMBER OF WHISKERS FORMED ON EACH SUBSTRATE | STRESS (MPa) |
|---|---|---|---|
| SAMPLE B | WITH Al OXIDE LAYER | 0 | 83.4 |
| SAMPLE C | WITHOUT Al OXIDE LAYER | 203 | 212.3 |

LIQUID CRYSTAL DISPLAY HAVING ALUMINUM WIRING

CROSS REFERENCE TO RELATED APPLICATION

This application is based on and claims priority of Japanese Patent Application No. 2003-017307 filed on Jan. 27, 2003, the entire contents of which are incorporated herein by reference.

BACKGROUND OF THE INVENTION

1. Field of the Invention

The present invention relates to a liquid crystal display and its manufacture method, and more particularly to a liquid crystal display having aluminum wiring and its manufacture method. In this specification, the term "aluminum" is intended to cover both aluminum and aluminum alloy.

2. Description of the Related Art

A liquid crystal display has the advantages that it is light in weight, can be driven at low voltage and has a low consumption power. Liquid crystal displays are widely used nowadays as various types of displays. In general, a liquid crystal display has the structure that liquid crystal is sealed between two transparent glass substrates. A black matrix, color filters, a common electrode, an alignment film and the like are formed on the inner surface of one glass substrate, and on the inner surface of the other glass substrate, thin film transistors (TFTs), gate wirings, signal wirings, pixel electrodes, an alignment film and the like are formed.

One pixel unit is formed, for example, by disposing three primary color filters and corresponding three pixel electrodes. A number of pixel units are disposed in a matrix shape, for example, several hundred rows and one thousand and several hundred columns to constitute a flat panel color display. In operation, pixel rows are sequentially selected by gate electrode wirings, and image signals are applied from signal wirings to the pixel electrodes of the same row at the same time.

An inverse stagger type thin film transistor is formed by forming gate wirings (including gate electrodes) of Cr or the like on a glass substrate, covering the gate wirings with a gate insulating film, and thereafter forming an amorphous silicon layer to be used as a channel layer. After a channel protective layer is formed on each channel region of the amorphous silicon film, a metal layer is formed on source/drain regions on both sides of each channel region, the metal layer being a high impurity concentration amorphous silicon layer for source/drain contacts (source/drain electrodes and signal wirings). After the metal layer is patterned, an insulating protective film is formed to cover each thin film transistor.

Contact holes are formed through the insulating protective layer, and a transparent electrode layer of indium tin oxide (ITO) or the like is formed and patterned into pixel electrodes. In this manner, the pixel structure of an active matrix substrate is formed.

For a normal type thin film transistor (with gate electrode above the channel region), after island regions of an amorphous silicon layer used as a channel layer are formed, a middle region of each island silicon layer is covered with a gate insulating film and a gate electrode is formed on the gate insulating film. Ions are implanted by using the gate electrode as a mask to form high impurity concentration source/drain regions. If the gate insulating film is patterned to make it extend outside the gate electrode, lightly doped drain (LDD) regions can be formed.

An operation speed of TFT of a liquid crystal display depends largely upon resistance and stray capacitance of each gate wiring line. It is effective to lower the gate wiring resistance in order to improve the operation speed. If aluminum having a low resistivity is used instead of refractory metal such as Cr, the gate wiring resistance can be reduced greatly.

However, if aluminum is used as the material of gate wiring, the gate dielectric breakdown voltage becomes very low so that it is difficult to use TFT as a switching element. The reason for this has been ascribed to poor heat resistance of aluminum and hillocks formed during a heat treatment used for the manufacture of TFTs.

If refractory metal such as Cr and Ta is used, the gate dielectric breakdown voltage becomes high so that TFTs can be used as switching elements. However, since refractory metal has a high specific electric resistivity, a switching speed lowers.

It has been proposed to form gate wirings by using a lamination layer of an aluminum layer having a low electric resistivity and a refractory metal layer highly resistant against heat (for example, refer to Japanese Patent Laid-open Publication SHO-64-84668). If an aluminum layer is covered with a refractory metal layer such as Cr, deformation such as hillocks of the covered aluminum hardly occurs.

However, if a lamination layer of an aluminum layer and a refractory metal layer is patterned, the side walls of the aluminum layer are exposed. There is a possibility that hillocks are grown from the side walls. It has been proposed to first pattern an aluminum layer, then stack a refractory metal layer and thereafter pattern the refractory metal layer by using another mask to cover the whole surface of the aluminum layer (for example, refer to Japanese Patent Laid-open Publication HEI-6-120503).

Since two patterning processes are performed by using different masks to form gate wirings (including gate electrodes), not only the number of masks increases, but also the size precision of TFTs is degraded.

It has also been proposed that an aluminum layer and a first refractory metal layer are stacked and patterned, and thereafter a second refractory metal layer is deposited and anisotropically etched to leave side walls of the second refractory metal layer only on the side walls of patterned gate wirings (for example, refer to Japanese Patent Laid-open Publication HEI-11-87716).

Since the upper surface of the aluminum layer is covered with the first refractory metal layer and the side walls thereof are covered with the second refractory metal layer, the formation of hillocks can be prevented efficiently. The aluminum layer and first refractory metal layer can be patterned by using the same mask and the second refractory metal layer can be patterned by anisotropic etching without a mask. The number of masks will not increase and the size precision can be improved. It is however necessary to add a deposition process for the second refractory metal layer and an anisotropic etching process.

As described above, various proposals have been made to use aluminum and reduce the gate wiring resistance of thin film transistors.

If low resistance aluminum is used as the material of wirings of a liquid crystal display, there arises the problem of formation of hillocks or whiskers. In order to prevent the formation of hillocks or whiskers, additional processes are necessary.

SUMMARY OF THE INVENTION

An object of this invention is to provide a manufacture method for a liquid crystal display, which uses aluminum wirings and can simplify additional processes.

Another object of this invention is to provide a manufacture method for a liquid crystal display, which uses aluminum wirings and can dispense with additional masking processes.

According to one aspect of the present invention, there is provided a method of manufacturing a liquid crystal display, comprising the steps of: (a) heating a liquid crystal display substrate and thereafter forming a main wiring layer of Al or Al alloy, in which grains are grown in the formed main wiring layer and the substrate is heated to such a temperature as the main wiring layer has an irregular surface having an average roughness Ra of 3 nm or larger; (b) forming a heat resistant cover metal layer on the main wiring layer to form a laminated metal layer; and (c) heating the substrate and forming an insulating film on the laminated metal layer by CVD.

According to another aspect of the present invention, there is provided a method of manufacturing a liquid crystal display, comprising the steps of: (a) forming a main wiring layer of Al or Al alloy on a liquid crystal display substrate; (b) exposing the substrate to an atmosphere containing oxygen to naturally oxidize a surface of the main wiring layer; (c) forming a heat resistant cover metal layer on the main wiring layer to form a laminated metal layer; and (d) heating the substrate and forming an insulating film on the laminated metal layer by CVD.

The reason for the formation of hillocks or whiskers on an aluminum wiring layer may be ascribed to heating processes of the thin film transistor forming method after the wiring layer is formed and to stress which is applied to the aluminum wiring layer from the upper cover metal layer. This stress abnormally grows grains of aluminum.

As the aluminum film is formed on a heated substrate, grains are generated to such an extent that the aluminum layer has an irregular surface. If a refractory metal layer or the like is formed on such an aluminum layer and a thin film transistor is formed, hillocks or whiskers can be suppressed.

Alternatively, after an aluminum layer is formed, it is exposed to an atmosphere containing oxygen to naturally oxidize the surface of the aluminum layer, and then a refractory metal layer or the like is formed. In this manner, stress can be relaxed and the formation of hillocks or whiskers can be suppressed.

According to still another aspect of the present invention, there is provided a liquid crystal display comprising: a liquid crystal display substrate; a main wiring layer made of Al or Al alloy and formed on the substrate; and a protective layer containing refractory metal and formed on the main wiring layer, wherein an upper surface of the main wiring layer has an average roughness of 3 nm or larger.

According to still another aspect of the present invention, there is provided a liquid crystal display comprising: a liquid crystal display substrate; and a main wiring layer made of Al or Al alloy and formed on the main wiring layer, wherein an upper surface of the main wiring layer is formed with a natural oxide layer.

As above, it is possible to use an aluminum layer as a wiring layer and suppress the formation of hillocks or whiskers.

DESCRIPTION OF THE PREFERRED EMBODIMENTS

Figure 1A:
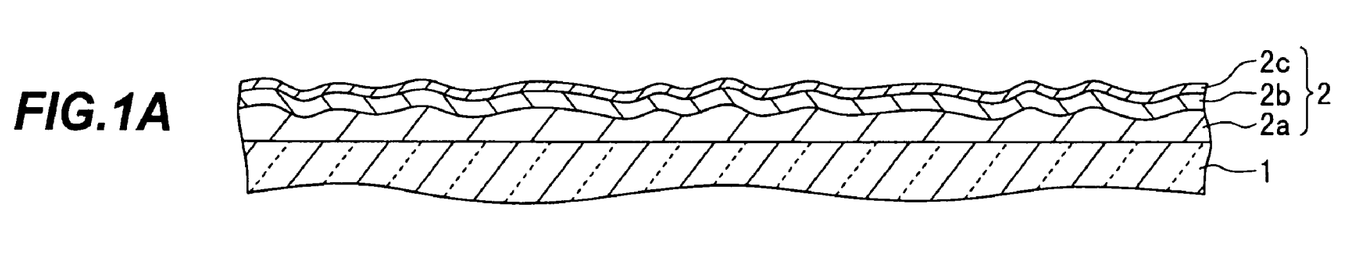
FIGS. 1A to 1E are cross sectional views illustrating a method of manufacturing a TFT substrate according to a first embodiment of the invention.

With reference to FIGS. 1A to 1E, description will be made on a method of manufacturing an active matrix substrate according to the first embodiment of the invention. An active matrix substrate is formed with thin film transistors (TFTs), wirings, pixel electrodes, storage capacitors and the like. As shown in FIG. 1A, a glass substrate 1 is transported into a heating chamber of a sputtering system and heated up to about 200° C., After this heating process, the glass substrate is transported into an aluminum film forming chamber, and an aluminum layer 2a is formed by sputtering to a thickness of, for example, 150 nm. Since the aluminum layer is formed after the substrate has been heated, grains of the formed aluminum layer grow in a vertical direction. This vertical growth of grains forms an irregular surface having an average roughness Ra of 3 nm or larger.

After the aluminum layer is formed, the substrate is transported into a chamber having a Mo target, without breaking vacuum. By introducing Ar and nitrogen gasses as reaction gasses, an Mo nitride layer 2b is formed, for example, to a thickness of 100 nm. By introducing only Ar gas into the same chamber, the Mo target is sputtered to form an Mo layer 2c to a thickness of, for example, 10 nm.

A laminated gate wiring (including gate electrodes) metal layer stacking such an aluminum layer, refractory metal nitride layer, and refractory metal layer has an irregular surface having an average roughness Ra of 2 nm or larger reflecting the average roughness of the aluminum layer.

Figure 1B:
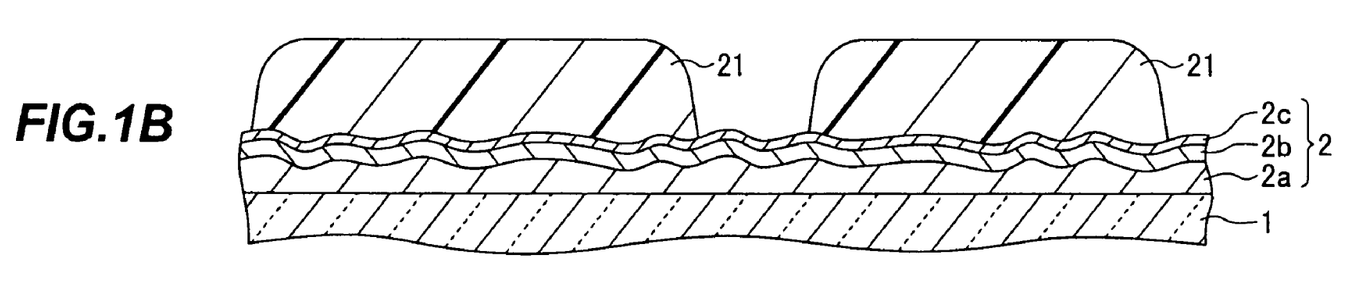

As shown in FIG. 1B, a photoresist layer is coated on the Mo layer 2c, exposed and developed to form a resist pattern 21. The resist pattern 21 has a pattern corresponding to gate wirings shown in the left area of FIG. 1B and a pattern corresponding to storage capacitor wirings shown in the right area of FIG. 1B.

Figure 1C:
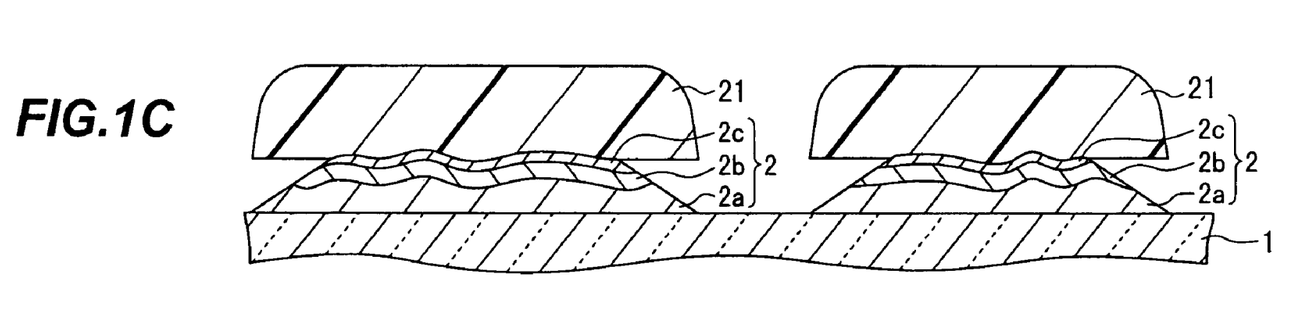

As shown in FIG. 1C, by using the resist pattern 21 as an etching mask, the underlying, laminated gate wiring metal layer is wet-etched by using phosphoric acid, nitric acid, and acetic acid as etchant. Gate wiring layers 2 including aluminum layers are therefore patterned. The resist mask 21 is thereafter removed.

Figure 1D:
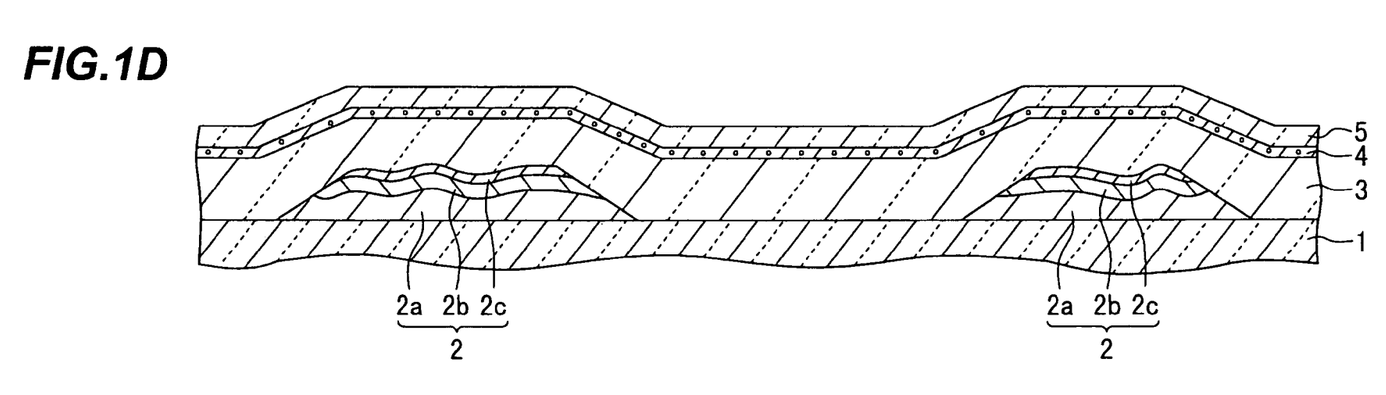

As shown in FIG. 1D, the substrate with the gate wiring pattern 2 is transported into a plasma enhanced (PE-) chemical vapor deposition (CVD) chamber wherein while the substrate is heated to 350° C., a silicon nitride layer 3 is deposited to a thickness of about 350 nm by flowing $SiH_4+NH_3$ as source gasses. Next, by flowing $SiH_4$ as a source gas, an amorphous silicon layer 4 to be used as a channel layer is deposited to a thickness of, for example, 50 nm.

By flowing SiH$_4$+NH$_3$ as source gasses, a silicon nitride layer 5 to be used as a channel protective layer is formed to a thickness of, for example, 120 nm.

During this PE-CVD process, the substrate is heated and the substrate surface is exposed to plasma. This PE-CVD process is one of the main processes which form hillocks or whiskers on an aluminum wiring layer. However, as in this embodiment, since the aluminum layer is deposited on the heated substrate, the formation of hillocks or whiskers during the succeeding processes can be suppressed.

Figure 1E:
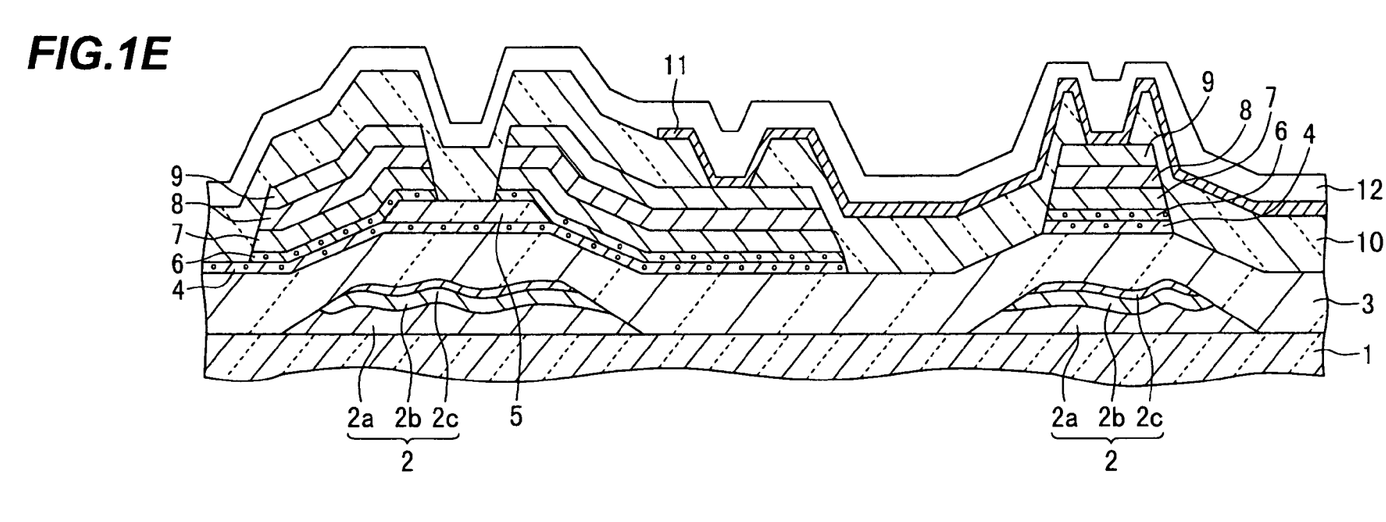

As shown in FIG. 1E, the SiN layer 5 to be used as the channel protective layer is patterned by using a photoresist pattern. The channel protective layer 5 is left so as to cover the channel region of the amorphous silicon layer 4. The channel protective layer in the storage capacitor region is removed.

As shown in FIG. 1E, the substrate with the patterned channel protective layer 5 is transported into the PE-CVD chamber and an n$^+$-type amorphous silicon layer 6 to be used as a contact layer is formed by PE-CVD in a manner similar to that described above, to a thickness of, for example, 30 nm.

Next, the substrate is transported into a sputtering system having a Ti target and an Al target to stack a signal wiring layer on the amorphous silicon layer 6, the signal wiring layer being used for forming source/drain electrodes and signal wirings. For example, a Ti layer 7 of 20 nm in thickness, an Al layer 8 of 75 nm in thickness and a Ti layer 9 of 80 nm in thickness are formed.

Thereafter, the Ti layer 9, Al layer 8, Ti layer 7 and amorphous silicon layer 6 are patterned by using a resist mask. During this patterning, the channel protective layer 5 functions as an etch stopper just above the channel region.

In the TFT region, the wiring lamination layers are left which are connected to the amorphous silicon layers 4 on both sides of the channel region protected by the channel protective layer 5, to form source/drain electrodes and wirings. In this manner, TFTs are formed. In the storage capacitor region, the upper lamination layers 4, 6, 7, 8 and 9 are left above the lower electrode 4 (wiring) 2 made of the same lamination as that of the gate wiring, with the gate insulating film 3 being interposed therebetween.

After the wiring lamination layer is patterned, a silicon nitride layer 10 to be used as an insulating protective layer is formed by PE-CVD in the manner similar to that described above, to a thickness of, for example, 330 nm. Contact holes are formed through the insulating protective film 10, exposing the surfaces of the source/drain electrodes and pixel electrodes. Thereafter, an indium tin oxide (ITO) layer 11 is formed by sputtering to a thickness of, for example, 70 nm. The ITO layer 11 is patterned into pixel electrodes to form the pixel structure including TFTs.

If necessary, an alignment film 12 of polyimide or the like is formed to a thickness of, for example, 80 nm and an alignment process such as lapping is performed. An active matrix substrate is formed in the manner described above.

Samples were formed by the above-described embodiment method. The formation of whiskers was inspected with a defect inspection system which optically inspects patterns.

Figure 2:
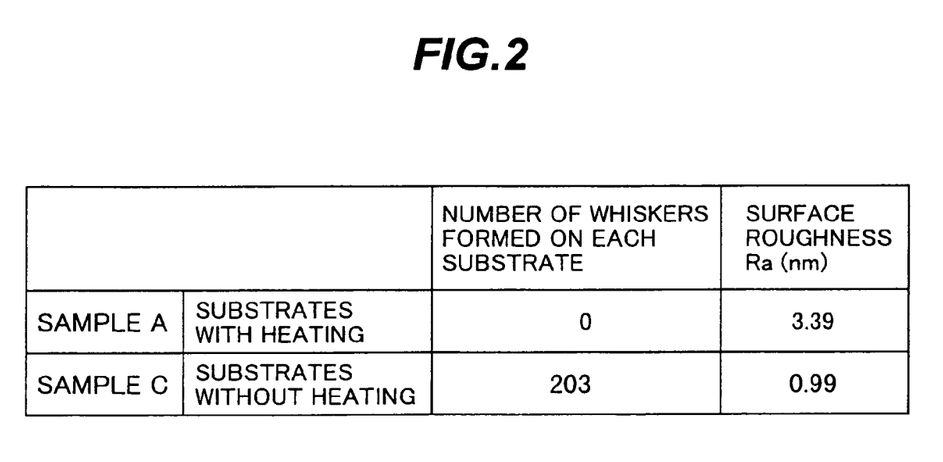
FIG. 2 is a table showing the inspection results confirming the effects of the first embodiment.

FIG. 2 is a table showing the measurement results. As comparative examples, samples C were formed whose aluminum layers were formed by sputtering without pre-heating substrates. For samples C, the number of whiskers formed on each substrate was 203. In contrast, for samples A formed by the embodiment method, the number of whiskers formed on each substrate was 0. It can be seen that considerable whisker suppression effects can be obtained by heating the substrate to 200° C. prior to forming the aluminum layer.

After an aluminum layer is formed on the heated substrate, an irregular surface (average roughness Ra) of the aluminum layer was measured with an atomic force microscope (AFM). The average roughness Ra is defined by the following equation (1):

$$Ra \equiv 1/LM \int |f(x, y)| dx dy$$

where x and y are optional directions perpendicular to each other and horizontal to the substrate, f(x, y) is a height of the surface of an aluminum layer, and L and M are constants.

The average roughness Ra of the surface of an aluminum layer was 0.99 nm for samples C, whereas the surface average roughness Ra was 3.39 nm for samples A having aluminum layers formed on the substrates heated to 200° C. It can therefore be considered that while the aluminum layer is formed by sputtering on the heated substrate, grains are grown in the sputtered aluminum layer and an irregular surface having the average roughness Ra of 3 nm or larger is formed on the aluminum layer.

As the substrate was heated to 200° C., the number of formed whiskers was reduced from 203 to 0. The whisker formation suppression effects can be expected to a sufficient degree even if the substrate heating temperature is lowered. Heating the substrate to about 175° C. may be effective. The whisker formation suppression effects can be expected if the average roughness Ra is 3 nm or larger.

If the substrate temperature is set too high, the sputtered aluminum layer may be reflowed. It can be considered that the grain growth can be enhanced by depositing the aluminum layer in a state not reflowing it. It is preferable from this viewpoint that the substrate temperature is set to 400° C. or lower. In summary, whiskers or hillocks can be prevented from being formed by succeeding processes if the substrate is heated to 175° C. to 400° C. and thereafter an aluminum layer is formed. The average roughness Ra of an irregular surface is preferably about 3 nm.

Figure 3A:
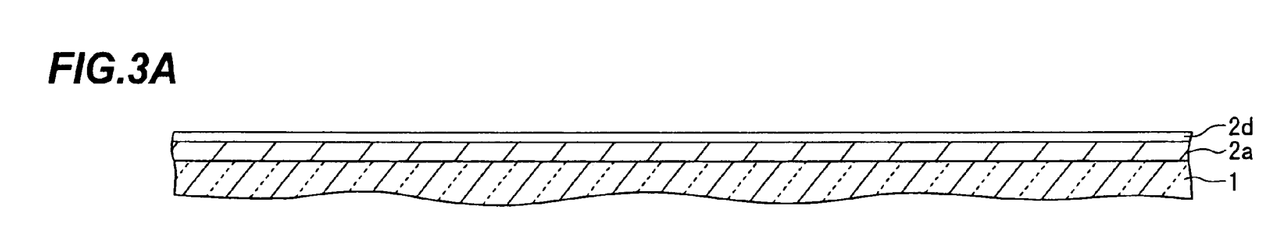
FIGS. 3A to 3C are cross sectional views illustrating a method of manufacturing a TFT substrate according to a second embodiment of the invention.
Figure 3B:
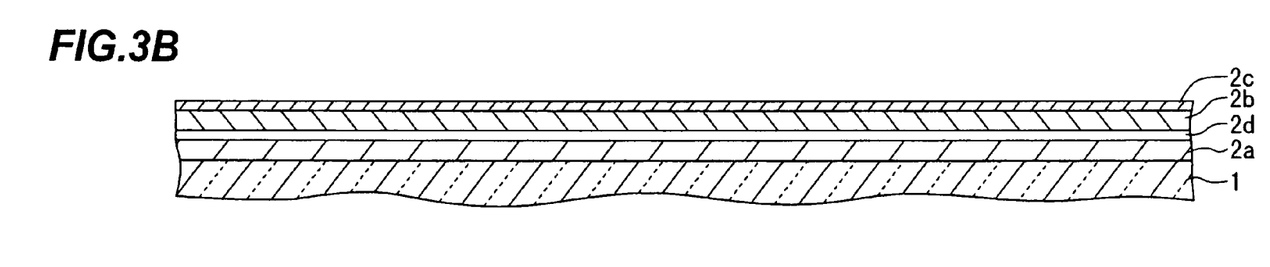
Figure 3C:
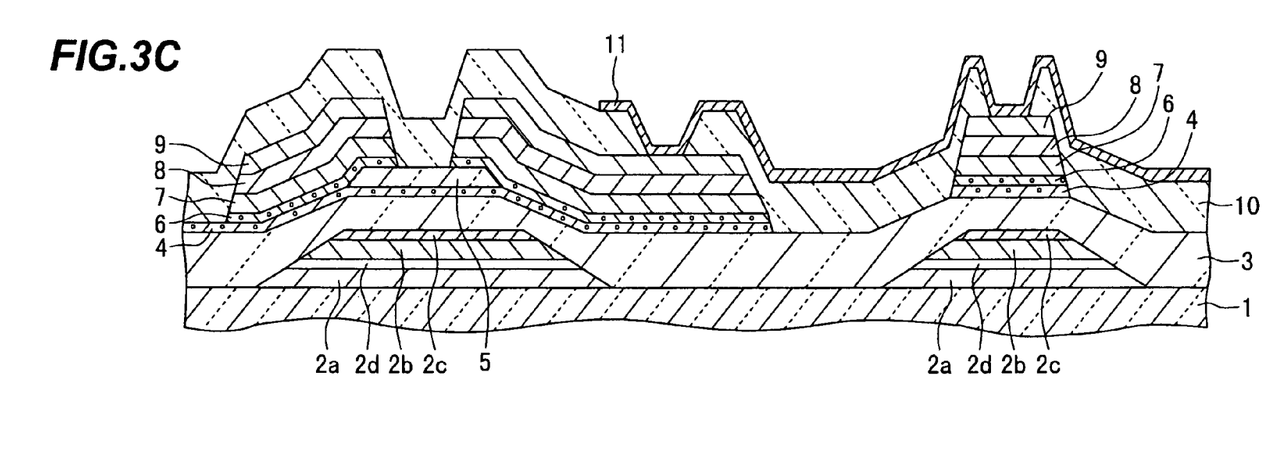

With reference to FIGS. 3A to 3C, description will be made on a method of manufacturing an active matrix substrate according to the second embodiment of the invention.

As shown in FIG. 3A, a substrate 1 is transported into a sputtering system and an aluminum layer 2a is formed to a thickness of, for example, 150 nm without pre-heating the substrate 1. The substrate formed with the aluminum layer by sputtering in the sputtering chamber in which plasma is generated raises its temperature to about 80° C. In this state, the substrate 1 is transported from the sputtering chamber into the atmospheric air via a load lock chamber, and left in the air for about 600 seconds (ten minutes) to form a natural oxide film 2d on the surface of the aluminum layer 2a. The natural oxide film 2a is a thin oxide film and has a thickness of 20 nm or thinner or preferably 10 nm or thinner.

As shown in FIG. 3B, the substrate with the natural oxide film 2d formed thereon is transported into a sputtering system having an Mo target. A Mo nitride layer 2b and a Mo layer 2c having thicknesses of 100 nm and 10 nm, respectively, are formed on the natural oxide film 2d. In this manner, a gate wiring layer (storage capacitor wiring layer) is formed. Thereafter, processes similar to the first embodiment are performed.

As shown in FIG. 3C, after the gate wiring layer (storage capacitor wiring layer) is patterned, a gate insulating film 3, an amorphous silicon layer 4 and a channel protective layer 5 are formed and the channel protective layer is patterned. A low resistance amorphous silicon layer 6, a Ti layer 7, an Al layer 8 and a Ti layer 9 are stacked. By using a resist mask, the layers down to the amorphous silicon layer 4 are patterned to form a TFT structure and a storage capacitor structure.

An interlayer insulating film 10 is formed and contact holes are formed therethrough. An ITO layer 11 is deposited and patterned by using a resist mask. If necessary, an alignment film is formed and an alignment process is performed.

Figure 4:
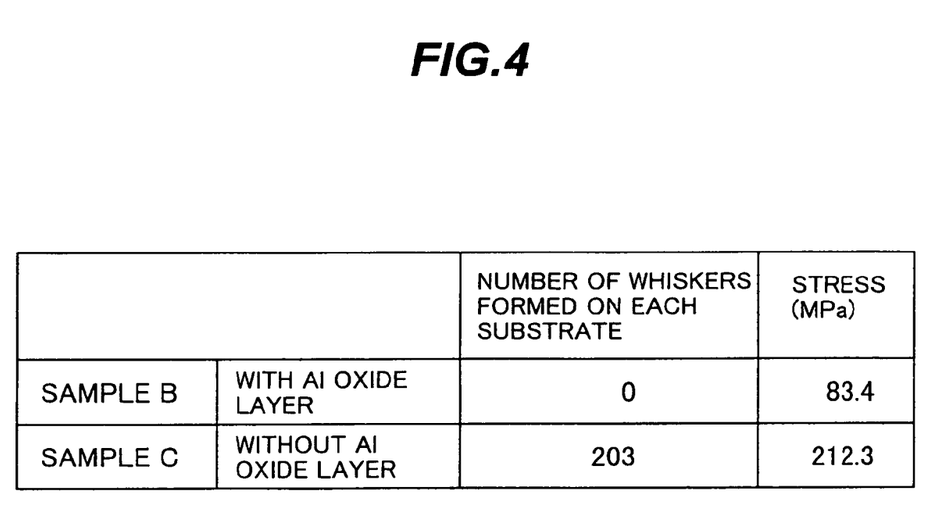
FIG. 4 is a table showing the inspection results confirming the effects of the second embodiment.

FIG. 4 is a table showing the measurement results of whiskers and hillocks formed on second embodiment samples and comparative example samples. Samples C are the same to samples C shown in FIG. 3. Samples B are formed by forming aluminum layers and thereafter exposing them to the atmospheric air to form natural oxide films.

The number of whiskers formed on each substrate was 203 for samples C, whereas the number of whiskers formed on each substrate was 0 for samples B. Considerable whisker suppression effects can be recognized.

The influence of stress relaxation by the formation of a natural oxide film was calculated from a warp of a wafer. The calculated stress was 212.3 MPa for samples C, whereas it was 83.4 MPa for samples B. By forming a natural oxide film on the surface of an aluminum layer, the stress is greatly relaxed from 200 MPa or larger to 100 MPa or smaller. This stress relaxation can be considered effective for the whisker formation suppression.

In the second embodiment, after the aluminum layer is formed, the layer is exposed to the atmospheric air to form a natural oxide film on the surface of the aluminum layer. Similar effects can also be expected if the substrate is exposed in an atmosphere containing oxygen in another chamber without placing the substrate outside of the sputtering system. The atmosphere containing oxygen is not always required to be at the atmospheric pressure. The whisker suppression effects are expected to be obtained at a stress of 150 MPa or lower.

Figure 5A:
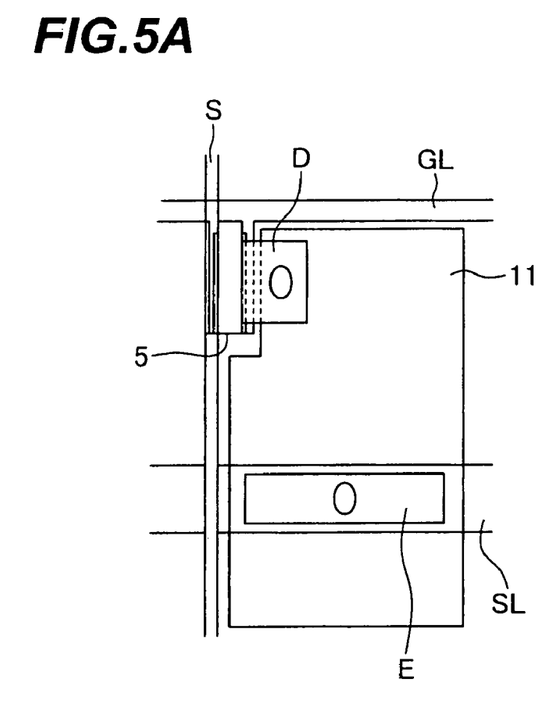
FIGS. 5A to 5C are plan views and a cross sectional view schematically showing the structure of a liquid crystal display.

FIG. 5A is a plan view showing the layout of a pixel on a TFT substrate. A gate wiring line GL and a storage capacitor wiring line SL are made of the same lamination structure and extend in the lateral direction. A TFT having a source/electrode/wiring line S and a drain electrode D as well as a storage capacitor electrode E is formed above the gate wiring line GL and storage capacitor wiring line SL, with a gate insulating film being interposed therebetween. An ITO pixel electrode 11 is formed on an insulating protective layer. TFTs and storage capacitor electrodes can be formed by the above-described embodiment methods.

Figure 5B:
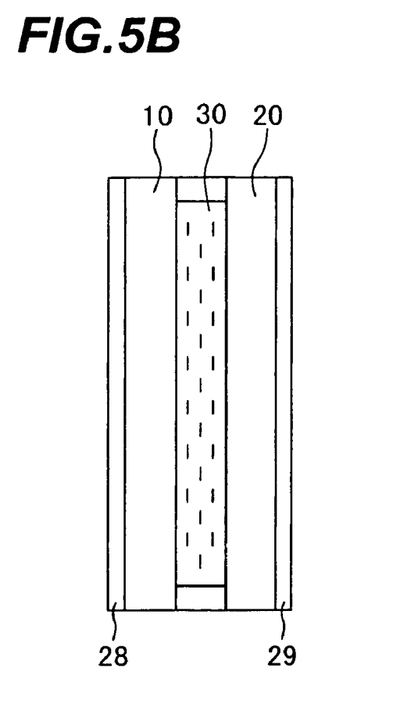

FIG. 5B is a schematic diagram showing the structure of a liquid crystal display. A TFT substrate 10 and a color filter substrate 20 are disposed facing each other. A liquid crystal layer 30 is sandwiched between the TFT substrate and color filter substrate. Polarizing plates 28 and 29 are disposed on the outer surfaces of the substrates 10 and 20. The color filter substrate has a well-known structure and is made by a well-known method.

The above description is directed to an inverse stagger type TFT. A normal type TFT with gate electrode above the channel region may also be manufactured.

Figure 5C:
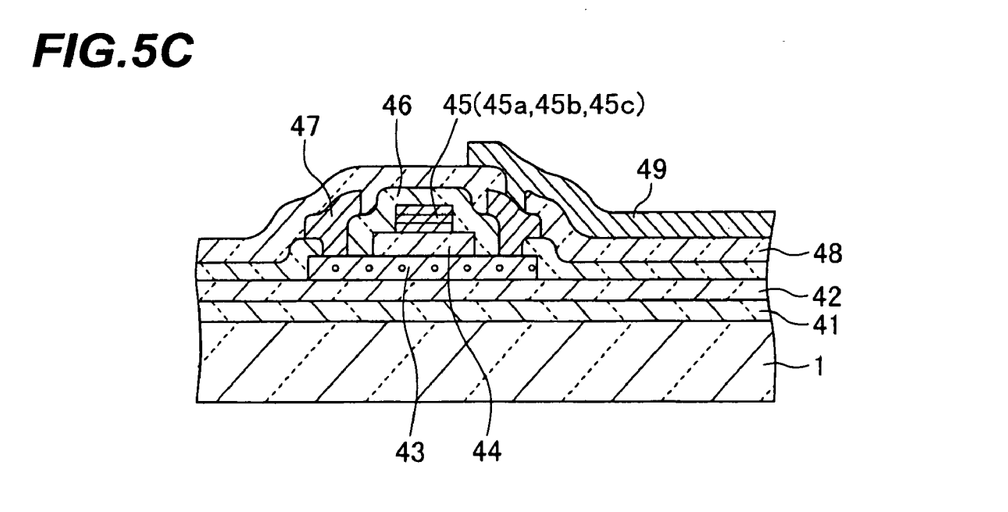

FIG. 5C shows an example of the structure of a normal type TFT. A silicon nitride layer 41, a silicon oxide layer 42 and an amorphous silicon or polysilicon layer 43 are stacked on a glass substrate 1, and the silicon layer 43 is patterned into island regions. A gate insulating film 44 is formed on the middle area of the silicon layer 43, and a gate electrode 45 is formed on the gate insulating film 44.

Similar to the embodiments described previously, the gate electrode layer 45 is made of a lamination structure of an aluminum layer 45a, a Mo nitride layer 45b and a Mo layer 45c. Either an aluminum layer is formed on a heated substrate to grow grains or a natural oxide film is formed on an aluminum layer after it is formed to relax stress.

Ion implantation processes are performed to form low resistance source/drain regions outside of the gate insulating film and off-set regions or LDD regions outside of the gate electrode and under the gate insulating film. An interlayer insulating film 46 is formed covering the gate electrode 45. Source/drain electrodes 47 are connected to the source/drain regions via contact holes formed through the interlayer insulating film. Another interlayer insulating film 48 is formed covering the source/drain electrodes and a transparent electrode 49 is connected via a contact hole formed through the interlayer insulating film 48.

The present invention has been described in connection with the preferred embodiments. The invention is not limited only to the above embodiments. For example, aluminum wirings may be made of not only pure Al but also Al alloy. The cover metal layer to be formed on the aluminum wiring is not limited to a lamination of a Mo nitride layer and an Mo layer. A single layer or a lamination layer of a refractory metal layer, an alloy layer of refractory metal, a refractory metal nitride layer and the like may be used. Refractory metal may be Mo, Ti, Cr, Ta, W or Nb.

Although TFTs are formed on a glass substrate, they may be formed on other types of substrates, with similar embodiment effects being expected. It will be apparent to those skilled in the art that other various modifications, improvements, combinations, and the like can be made.

What we claim are:

1. A liquid crystal display comprising:
   a liquid crystal display substrate;
   a main wiring layer made of Al or Al alloy and formed on said substrate; and
   a protective layer containing refractory metal and formed on the main wiring layer,
   wherein an upper surface of said main wiring layer has an average roughness of 3 nm or larger.

2. The liquid crystal display according to claim 1, wherein said main wiring layer forms gate wiring lines and storage capacitor wiring lines, and the liquid crystal display further comprises:
   a gate insulating film covering said protective layer;
   a semiconductor layer formed on said gate insulating film;
   an insulating layer covering a region above said semiconductor layer; and
   pixel electrodes formed on said insulating layer.

3. The liquid crystal display according to claim 1, further comprising:
   an opposing substrate; and
   a liquid crystal layer sandwiched between said liquid crystal display substrate and said opposing substrate.

4. The liquid crystal display according to claim 1, wherein said main wiring layer includes grains without whiskers.

5. The liquid crystal display according to claim 1, wherein said protective layer is a two layer structure that includes a refractory metal layer formed upon a refractory metal nitride layer.

6. The liquid crystal display according to claim 5, wherein said refractory metal nitride layer is composed of Mo nitride and said refractory metal layer is composed of Mo.

7. The liquid crystal display according to claim 5 wherein said refractory metal nitride layer is of a thickness of approximately 100 nm and said refractory metal layer is of a thickness of approximately 10 nm.

* * * * *